United States Patent
Brown

Patent Number: 5,316,568
Date of Patent: May 31, 1994

[54] METHOD AND APPARATUS FOR PRODUCING FLUID FLOW

[76] Inventor: Melvin H. Brown, R.R. 2, Box 299, Morning Sun, Iowa 52640

[21] Appl. No.: 991,216

[22] Filed: Dec. 15, 1992

[51] Int. Cl.⁵ .................. B01D 53/22; B01D 53/24
[52] U.S. Cl. .................................. 95/31; 95/45; 96/4; 55/465; 55/525
[58] Field of Search ............... 55/16, 17, 66, 158, 55/277, 525, 465; 417/572; 95/31, 45; 96/4

[56] References Cited

U.S. PATENT DOCUMENTS

| | | | |
|---|---|---|---|
| 2,609,059 | 9/1952 | Benedict | 55/16 |
| 3,208,197 | 9/1965 | Simon et al. | 55/16 |
| 3,677,844 | 7/1972 | Fleischer et al. | 55/389 X |
| 3,713,921 | 1/1973 | Fleischer et al. | 55/389 X |
| 3,725,271 | 4/1973 | Giannotti | 55/17 X |
| 3,777,809 | 12/1973 | Milde, Jr. | 55/16 X |
| 3,811,999 | 5/1974 | Fleischer et al. | 55/389 X |
| 3,813,856 | 6/1974 | Jensen | 55/17 X |
| 3,973,928 | 8/1976 | Nierenberg et al. | 55/16 |
| 4,135,898 | 1/1979 | Rosengard | 55/17 X |
| 4,147,480 | 4/1979 | Deutsch | 417/572 |
| 4,147,481 | 4/1979 | Deutsch | 417/572 |
| 4,280,909 | 7/1981 | Deutsch | 417/572 X |
| 4,284,418 | 8/1981 | Andres | 55/17 X |
| 4,373,941 | 2/1983 | Lagelbauer | 55/17 X |
| 4,466,811 | 8/1984 | Johnson, III | 55/17 |
| 4,813,851 | 3/1989 | Chun et al. | 417/572 X |
| 5,145,493 | 9/1992 | Nguyen et al. | 55/17 |
| 5,204,003 | 4/1993 | Cochran, Jr. | 55/17 X |

FOREIGN PATENT DOCUMENTS

| | | | |
|---|---|---|---|
| 1020960 | 12/1957 | Fed. Rep. of Germany | 55/17 |
| 2413990 | 9/1974 | Fed. Rep. of Germany | 55/17 |
| 2900689 | 7/1980 | Fed. Rep. of Germany | 55/17 |

*Primary Examiner*—Jay H. Woo
*Attorney, Agent, or Firm*—Andrew Alexander

[57] ABSTRACT

A membrane having a multiplicity of openings therethrough which are sized and shaped to utilize the random motion of molecules of gas to produce gas flow through the membrane predominantly in one direction. Such a membrane can be used in power systems, gas separation systems and other systems which utilize fluid flow.

23 Claims, 4 Drawing Sheets

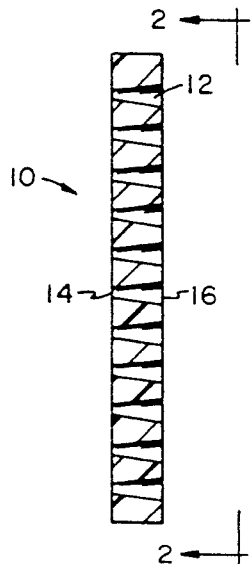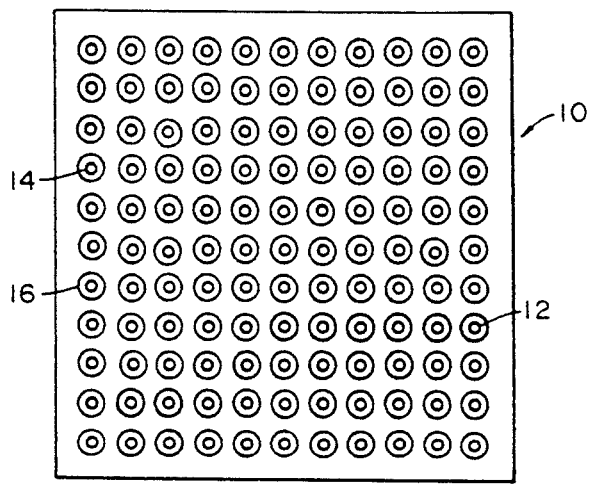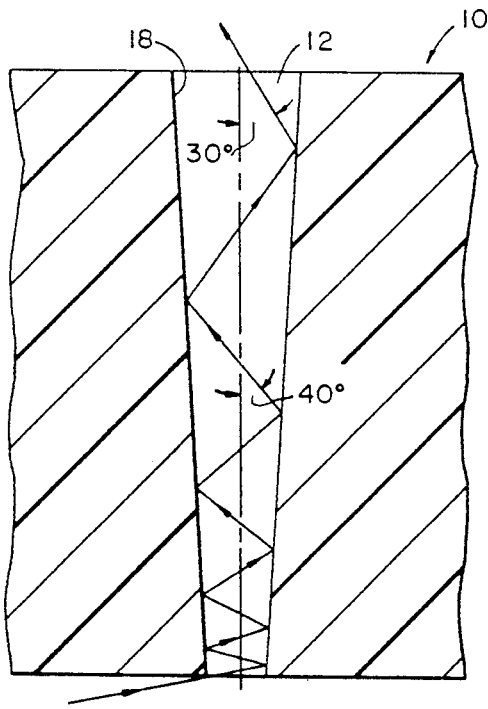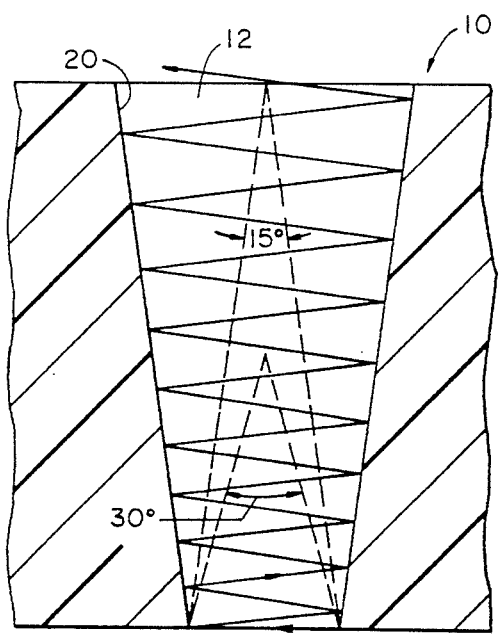
FIG. 1
FIG. 2
FIG. 3
FIG. 4

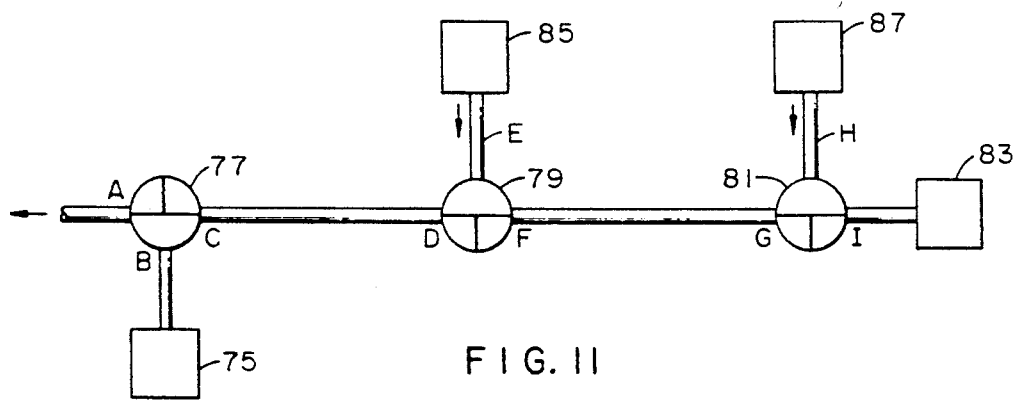
FIG. 11
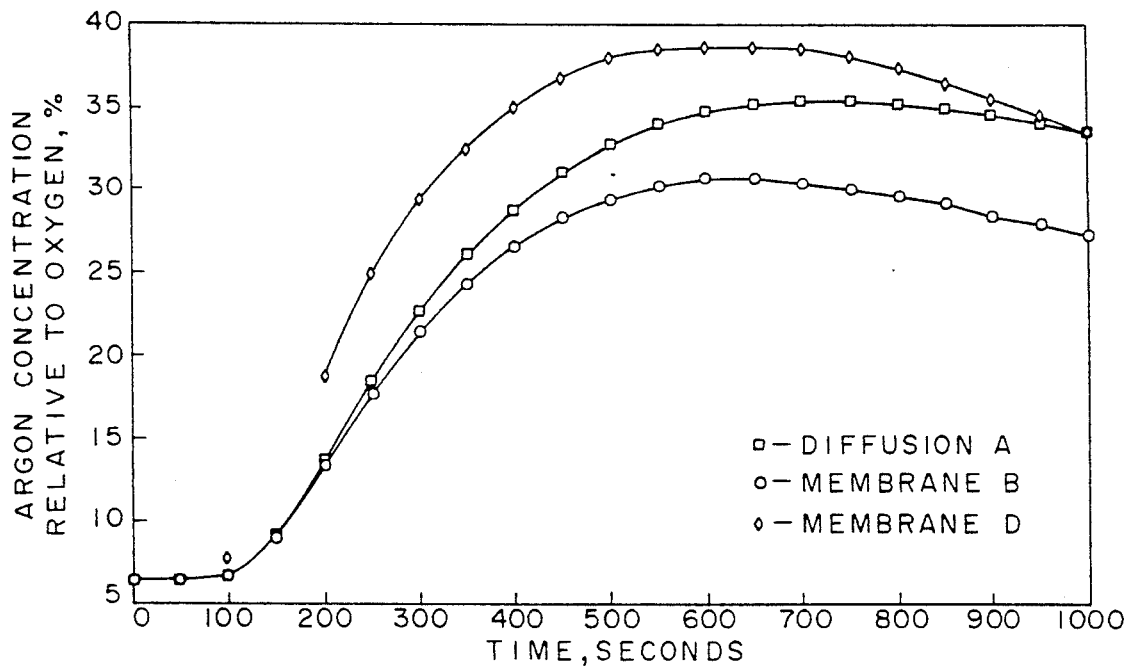
FIG. 12
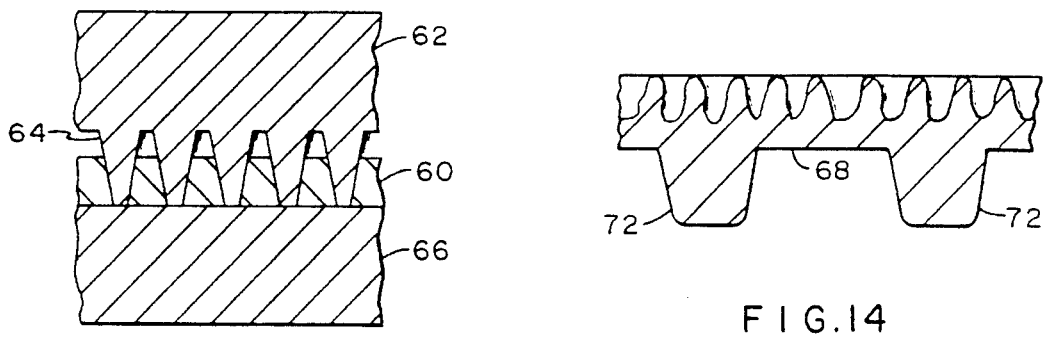
FIG. 13
FIG. 14

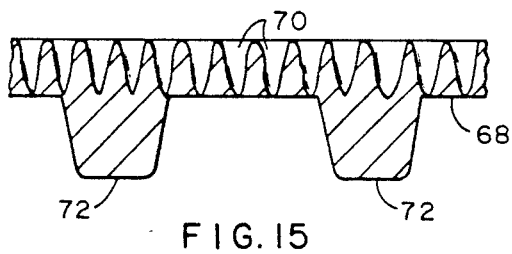
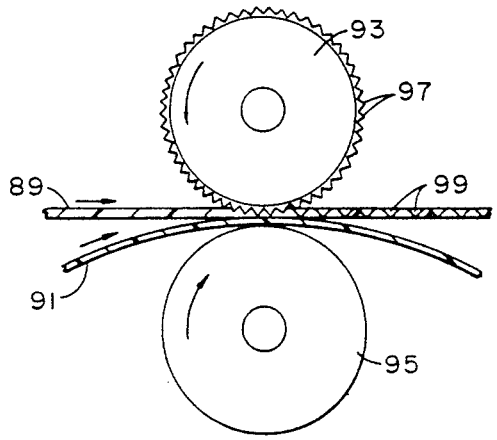
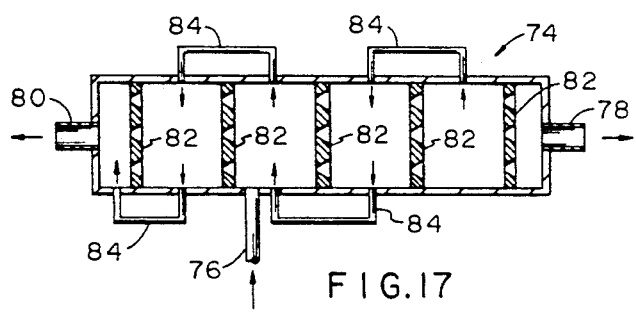
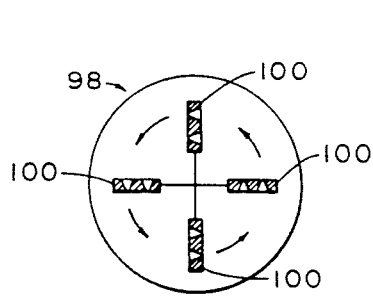
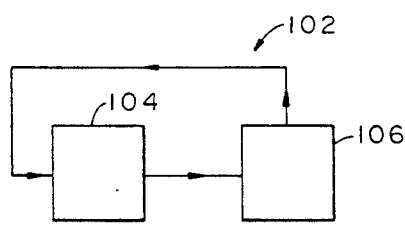
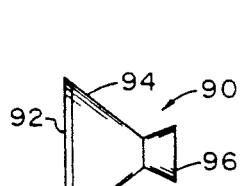
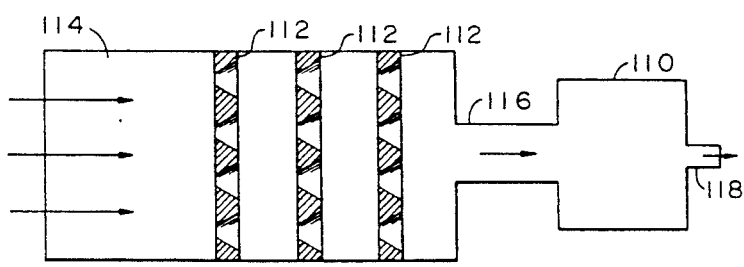

METHOD AND APPARATUS FOR PRODUCING FLUID FLOW

FIELD OF THE INVENTION

This invention relates to a method and apparatus for producing fluid flow and in particular to a membrane or wall having openings therethrough which are sized and shaped to utilize the random motion of atoms or molecules in a gas to move the gas through the membrane predominantly in one direction.

BACKGROUND OF THE INVENTION

It is well known to produce fluid flow by various mechanical devices such as fans and pumps. It is also well known that fluid flow can be produced by causing temperature or pressure changes in a fluid as by heating a fluid or gas to cause circulation of the fluid or circulation of the vapors created by the heating process. Heating of air and water by the sun for example produces fluid flow in the atmosphere and bodies of water. Most systems for producing fluid flow require the application of external energy or power such as electricity, heat, animal power, or other energy sources. It is also known that fluids can be moved through a porous membrane by osmosis, which requires no external energy, and by reverse osmosis which requires the application of pressure.

It is also known that gases consist of large numbers of molecules that are in continuous random motion. As used herein, molecule designates that smallest particle of any gas, which with some gases consists of combined atoms or in other uncombined atoms. The continuous random motion of the molecules of gas results in many collisions of the molecules. These collisions occur quite frequently for a gas at atmospheric pressure, about $3 \times 10^9$ per sec for each molecule of air. Because of these collisions, the direction of motion of a gas molecule is constantly changing. The diffusion of a molecule from one point to another consists of many short, straight-line segments as collisions buffet them around in random directions. Diffusion is faster for light molecules than for heavy ones. The average distance traveled by a molecule between collisions is known as the "mean free path". The higher the density of a gas, the smaller the mean free path. This means that the more molecules there are in a given volume, the shorter the average distance traveled between collisions. The term "diffusion" refers to the spread of a substance throughout a space or throughout a second substance. For example, the molecules of a perfume diffuse through a room.

The rate at which a gas is able o escape through a tiny hole depends on the molecular mass of the gas. The process of escape is known as "effusion".

It is further known that lighter atoms or molecules of gas have a higher average speed than heavier molecules. Thus, it is known that atoms of a lighter gas are with a higher average speed will pass through a hole more rapidly than will molecules of a heavier gas. This phenomenon has been used to separate gases of different weights by passing such gases through porous barriers or membranes.

The continuous zigzag motion of particles in a colloidal suspension is known as "Brownian movement". The motion is caused by impact of the molecules of the liquid upon the colloidal particles. Similarly, the Brownian movement in gases involves constant motion of dust particles as a result of uneven bombardment by air molecules. This invention utilizes a Brownian type movement in fluids.

There are many uses for apparatus that cause fluid flow including heating and cooling systems, power generation systems, fluid transfer systems among others.

There is a need for a system for causing fluid flow that uses little or no external energy to thereby minimize the cost of producing the fluid flow.

There is also a need for systems for improving the efficiency of separating gases of various molecular weights.

SUMMARY OF THE INVENTION

This invention provides means for causing fluid flow by use of a membrane having small openings or pores therethrough that are of a size and shape to utilize the random motion of the molecules in the fluid, i.e. erratic Brownian type movement of molecules, to cause the fluid to flow through the membrane predominantly in one direction. Most of the openings in the membrane must be smaller on one surface of the membrane than on the other surface to cause the fluid to flow predominantly in one direction. Fluid flows through the membrane from the side thereof with the smaller opening to the side thereof with the larger opening. The openings or pores in the membrane may have a cross-sectional extent or diameter of the same order of magnitude as the mean free path of the fluid to be moved therethrough. It is believed that membranes having openings up to about 0.001 cm can be used in the practice of this invention at atmospheric pressures and much larger openings for practice of the invention in vacuums. Membranes of this invention preferably have large numbers of openings in them in order to maximize the fluid transfer therethrough. The openings are preferably frusto conical for maximum efficiency, but may be of a variety of cross-sectional configurations such as oval, square or rectangular provided they have the required difference in size on opposite sides of the membrane.

The interior surface of the pores in the membrane are preferably reflective to maximize reflection of gas molecules off of such surfaces. However, non-reflective interior surfaces in the pores can also be employed.

In a preferred embodiment, all or a large majority of the openings in the membrane are oriented with the smaller opening in the same face of the membrane to maximize fluid transfer therethrough. The efficiency of operation of a method and apparatus can be increased by operating at elevated temperatures to thereby elevate molecular activity of the fluid.

An object of this invention is to provide a membrane having pores therethrough of a size and shape to cause fluid flow through the membrane.

A further object of this invention is to provide a method for producing fluid flow by utilizing a random motion of atoms and/or molecules in the fluid.

Another object of this invention is to provide power generating systems which utilize porous membranes for producing fluid flow. Some proposed uses for such power systems include providing power for heating, air-conditioning and refrigeration, propulsion in the stratosphere and other power needs in space.

Another object of this invention is to provide a method and apparatus for increasing the efficiency of separating heavier and light molecules of fluid. Some proposed uses include separation of radon or carbon dioxide from air in homes; separation of deuterium from hydrogen, hydrogen from carbon monoxide, and helium from natural gas; separation of helium, neon, argon and krypton from air; and separation of chemicals in vapor phases such as ethanol and water.

The above and other objects and advantages of this invention will be more fully understood and appreciated with reference to the following drawings and the detailed description of the invention.

BRIEF DESCRIPTION OF THE DRAWINGS

FIG. 1 is an enlarged fragmentary cross section through a membrane of this invention taken on line 2—2.

FIG. 2 is a plan view of the membrane of FIG. 1.

FIG. 3 is a greatly enlarged cross section through a membrane of this invention showing a pore therethrough having a specular reflective interior surface.

FIG. 4 is a greatly enlarged cross section through a membrane of this invention showing a pore therethrough having a non-reflective interior surface.

FIG. 11 is a schematic diagram of another experimental set-up to determine whether a membrane of this invention will produce fluid flow therethrough.

FIG. 12 is a plot of the results of experiments conducted with the set-up of FIG. 11.

FIG. 13 is a cross section showing piercing of a metal sheet with tapered steel members to produce a membrane of this invention.

FIG. 14 is a cross section through an anodized sheet of soft aluminum which is to be formed into a membrane of this invention.

FIG. 15 is a cross section of the sheet of aluminum from FIG. 14 after it has been acid etched to form a porous membrane.

FIG. 16 is a side elevation view of an alternative system for producing membranes of this invention.

FIG. 17 is a cross section of a fractionating column of this invention for separating light and heavy molecules of gas.

FIG. 18 is a schematic illustration of a power generating system utilizing this invention.

FIG. 19 is a schematic illustration of another power generating system utilizing this invention.

FIG. 20 is a schematic illustration of still another Power generating system of this invention for operating at low pressures.

FIG. 21 is a schematic illustration of a system of this invention for producing atmospheric pressures from thin atmospheres.

DESCRIPTION OF THE PREFERRED EMBODIMENTS

Figure 5:
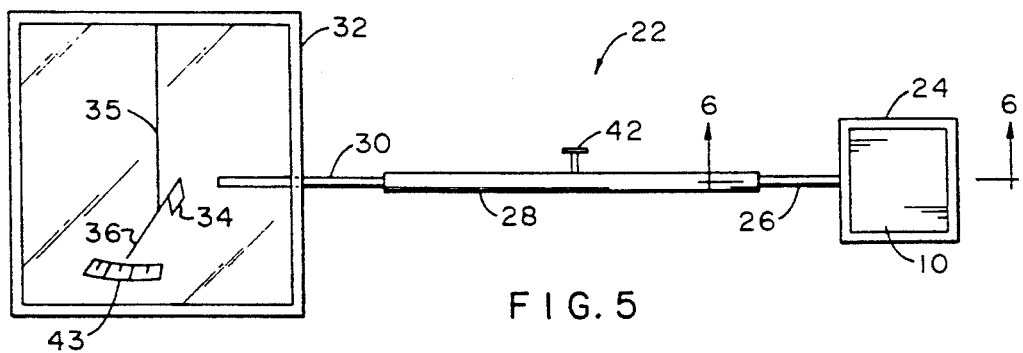
FIG. 5 is an illustration of a flow detector assembly for determining gas flow through a membrane of this invention.

Referring to the drawings, and particularly to FIGS. 1 and 2, a small section of a membrane 10 of this invention is illustrated, greatly enlarged. The membrane 10 may be formed from a variety of materials such as metal, plastic, paper or composites. The membrane 10 selected for purposes of illustration is made of plastic such as a polyethylene sheet material.

The membrane 10 of FIGS. 1 and 2 is preferably relatively thin such as approximately 0.008 cm thick but may be thinner or thicker depending on the material and its use. The membrane has a plurality of small passageways, holes or pores 12 therethrough, most or all of which have a small opening 14 in one side or face of the membrane and a larger opening 16 in the opposite face. For most efficient functioning, all or a large majority of the pores 12 are oriented alike so the small openings 14 are in the same face of the membrane. In FIG. 1, all the small openings 14 are on the left hand side of the membrane.

The pores 12 in the membrane 10 are preferably closely spaced to maximize their number without adversely affecting the structural integrity of the membrane. The pores 12 are also preferably quite small, i.e. on the same order of magnitude as the mean free path of the gas molecules to be moved thereby. Pores having a minimum cross sectional extent of less than 50 times the mean free path of the gas to be moved are preferred, but they may have a minimum cross sectional extent of 300 or more times the mean free path of the gas.

The mean free path depends on the kind of gas to be moved and the gas pressure and temperature among things, so the optimum size of the pores 12 will also depend on such factors. The optimum size of the pores will also depend on the nature of the membrane, the method by which the pores are formed, the surface conditions in the pores and the use to which the membrane is to be put.

The pores in a membrane of this invention each preferably has a gradually increasing diameter or cross-sectional extent from one side of the membrane to the other. The embodiment selected for illustration in FIG. 1 has pores which are frustoconical in shape, but the pores can have a variety of shapes provided they generally increase in cross-sectional extent from one side of the membrane to the other. The openings for the pores can also have a variety of shapes such as round, rectangular or oval. It may be desirable for the openings to have a particular shape, such as rectangular, and/or for the small and large openings to have different shapes in order to maximize the efficiency of the membranes.

While not limiting the invention to a theory of operation, it is believed that this invention utilizes the continuous random motion of molecules of a fluid, such as a gas, by focusing the molecules through the pores in a membrane as is illustrated in FIGS. 3 and 4. FIG. 3 shows a greatly enlarged pore 12 through a membrane 10 in which the pore wall has a specular reflective surface 18 so that gas molecules will be effectively reflected therefrom. FIG. 4 illustrates a greatly enlarged pore which has a non-reflective surface 20.

As illustrated in FIG. 3, molecules entering the pore at the bottom of the membrane at an angle of almost 90° from the vertical axis of a pore with a specular reflective surface will be reflected at decreasing angles, to the axis of the pore, toward the top of the membrane. At the midway point in a pore having the configuration of pore 12 in FIG. 3, the angle would be about 40° from the axis, and at the top would be about 30° from the axis. If the direction of the molecule were reversed, i.e. the molecule enters the top of the pore at an angle of about 30° to the pore axis, the same path in reverse direction would be followed to the bottom. It is evident that every molecule entering the bottom or small end would have to move toward the top end or large opening. In contrast, of those molecules entering the top of a pore having the dimensions of the pore in FIG. 3, only those molecules entering at an angle to the axis of less than about 30° could move out of the bottom opening while those entering at an angle of greater than about 30° would be reflected back toward the top of the pore.

For molecules in random motion starting halfway between the top and bottom only 80/360 or 22% could escape from the bottom while about 360-80/360 or 78% could move toward the top. Thus, if the above hypothesis is correct, the random motion of molecules in the pores of the type illustrated would be altered so that the gas flows from the small end of the pores to the large end of the pores. The pore therefore acts to focus or direct a majority of the gas molecules to move through the pore from the bottom to the top of the membrane, i.e., from the small opening to the large opening.

The shape and dimensions of the membrane will determine what the percent of molecules entering the top will escape out the bottom. Pores having a greater differential in the size of the top and bottom opening and/or having a greater length (membrane thickness) will produce higher percentages of fluid flow in the desired direction in the individual pore, i.e. fewer molecules entering the large opening will escape through the small opening. However, if most of the pores in a membrane have a greater differential between the small and large openings, the membrane will accommodate fewer pores. This means that the membrane will have less total area of small openings for gas to enter. Thus, the net fluid flow through a membrane having a greater differential between the size of the small and large openings may be less even though the percent of molecules that escapes through the small opening is less for each individual pore.

A greater differential between the large and small openings also means that the total area of the large openings is greater and that more molecules will enter the large openings. This can result in less efficient operation of the membrane even though the percentage of molecules that can escape through the small openings would be lower.

It is therefore desirable to balance the differential of opening sizes of the pores against the total number of pores in the membrane to produce optimum efficiency. For this reason, it is believed that a membrane is desired in which the ratio of widths of large and small openings should be in a range of 2-4, and preferably about 3. The sides of the pores should be at an angle of approximately 10°-60° to the pore axis, and preferably at an angle of about 20°-45° to the pore axis. The ratio of the thickness of the membrane to the width of the openings is also an important factor in the efficiency of the membrane. The ratio of the thickness to the width of the large opening should be in the range of 2-4 and preferably about 3. The optimum ratio of the width of the large and small openings, angle of the side walls and the ratio of the membrane thickness to the width of the pores will depend on a number of factors such as the material from which the membrane is made, the method of forming the pores, and the fluid to be moved by the membrane.

FIG. 4 illustrates the path of a gas molecule entering the bottom of the pore 12 at an angle almost 90° from the vertical axis when pore has a non-reflective surface 20 on its sides. In contrast to the mechanism of specular reflection assumed in FIG. 3, it is assumed that, a layer of gas molecules is adsorbed on the wall of the pore and that molecules hitting the adsorbed layer are temporarily adsorbed and later rejected at an average angle of 90° to the pore wall.

It is evident that every molecule entering the bottom (small end) would have to move toward the top end (large end). For molecules entering the top of the pore having the configuration illustrated in FIG. 4, only those molecules entering at an angle to the axis of less than about 7.5° could move out of the bottom of the pore while those entering at an angle of greater than about 7.5° would be reflected back toward the top of the pore. For molecules in random motion starting halfway between top and bottom only 30/360 or 8.3% could move out of the bottom of the pore while 360-30/360 or 91.7% would move toward the top. For pores of different configurations, the percent of molecules that would move out the bottom will differ as explained above for pores having reflective surfaces.

If the above hypothesis is correct, it explains how the random motion of molecules in pores of the type illustrated can be altered in accordance with this invention so that a gas flow from the small to large ends of the pores can be induced. It seems probable that the mechanism in actual pores would be somewhere between the mechanism illustrated in FIGS. 3 and 4.

Another possible theory for the movement of gas through membranes with small pores of certain sizes and shapes is that an adsorbed layer of molecules on the pore walls is subjected to erratic bombardment by rapidly moving gas molecules so that theoretically more molecules are ejected from points, corners or convex surfaces than are ejected from a flat surface or a concave surface. The orientation of the various surfaces might therefore produce a net movement of molecules in one direction when the interior walls of the pores have a desired configuration such as inwardly convex adjacent the large opening to each pore.

Another possible theory is that movement of molecules across a junction between two surfaces with different adsorbtivities might occur, with a net movement from the thick adsorbed layer toward the surface with a thinner layer. Thus the pores in the membrane may be designed to have different adsorbtivities proximate the large and small openings so as to induce flow predominantly in one direction through the membrane.

Figure 6:
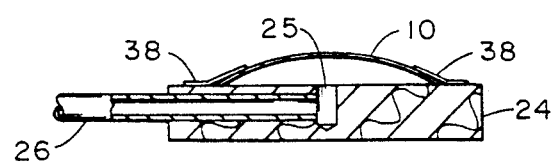
FIG. 6 is a cross section through the membrane secured to the apparatus of FIG. 5 taken on line 6—6.

FIGS. 5 and 6 illustrate an experimental flow detector 22 for measuring the gas flow produced by apparatus of this invention. The detector 22 includes a rectangular cover 24 to which a membrane 10 of this invention is secured. Tubes 26, 28, 30 lead from the cover 24 to an enclosed box 32 which contains a target 34 to which an indicator 36 is attached for measuring the deflection of the target by gas flow into or out of the box.

A membrane 10 is secured to the top of the rectangular air tight cover 24 with tape 38. The cover 24 has an opening 25 therethrough leading to tubes 26, 28, 30 which are connected to and lead into an enclosed box 32. The target 34 is suspended in the box 32 by a thread 35 and is connected to a pointer 36 for indicating movement of the target. The box 32 preferably has indicia or a scale 43 on one wall thereof to facilitate visual reading of the amount of movement of the pointer 36. The box 32 has at least one transparent wall to permit viewing of the target 34, pointer 36 and measurement scale 43 in the box. The tube 28 has valve means 42 associated therewith to start and stop the flow of gas through the tube.

In an experimental flow detector 22 which was used to test for fluid flow through a membrane of this invention, the cover 24 is formed from a square of cardboard approximately 9.5 cm square, and a membrane 10 is taped thereto around all four sides of the membrane in such a way that the membrane is raised above the surface of the cover to permit fluid flow therethrough. The membrane 10 is positioned on the cardboard cover 24 with the pores therethrough having their small opening in the upper surface of the membrane. The tube 28 is a rubber tube having a 0.8 cm internal diameter (ID) and a 1.2 cm external diameter (OD). The valve means 42 is a block of wood which is adapted to be pressed downwardly against a firm support under the tube to shut off flow gas through the tube. The tube 30 into the box 32 and the tube 26 connected to the cover 24 are copper, and each has a 0.5 cm ID and 0.65 cm OD.

The test procedure was to open the tube 28 so that air flow through the membrane 10 would pass through the tubing and impinge on the target 34. The pointer 36 will move to the right indicating that the air flow moved the target away from the end of the tube 30. After a period of time the line was closed and, if air is flowing through the tubes, the pointer will move to the left indicating movement of the target toward the end of the tube 30 as the air flow is stopped.

Membranes were prepared for testing in the apparatus as illustrated in FIG. 5 by piercing xerox paper which had been treated by coating one side with a solution containing equal parts of skim milk and milk of magnesia, drying the coated paper and burnishing the coated side. Next, a thin layer of 1.5% soap solution was rubbed on the coated side and dried, followed by application of a second identical layer of soap solution which was dried. The coated side was again burnished and a final thin layer of 3.5% gelatin was applied and dried. The xerox paper is naturally porous, and the coating of one side reduced the size of the openings or pores on that side of the paper.

Figure 8:
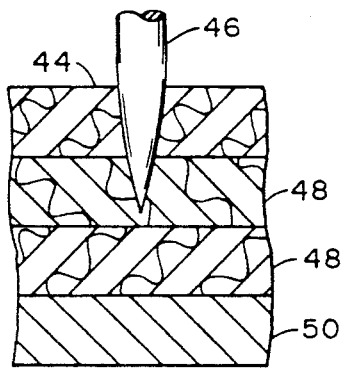
FIG. 8 is a cross-sectional view showing a method of piercing a membrane to produce tapered pores therethrough.
Figure 9:
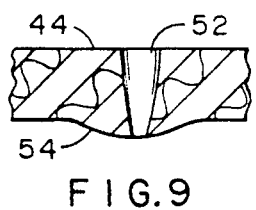
FIG. 9 is a cross section of a membrane showing an opening after having been pierced with a small needle.
Figure 10:
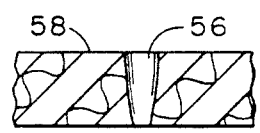
FIG. 10 is a cross section similar to FIG. 9 but showing the one surface of the membrane with the small size opening therein after the underside of the membrane has been burnished.

Membranes were also prepared by piercing treated paper 250 or more times with a tapered needle 46 as illustrated in FIG. 8. The treated paper 44 was backed up with sheets of paper 48 and a supporting sheet of steel 50 to form the desired pores through the material. One hundred to two hundred small punctures 52 were made in each sheet 44. FIG. 9 illustrates a cross section of a puncture 52 through the sheet 44 and shows a small downward protrusion 54 of the undersurface of the material as caused by the needle penetrating through the material. With some membranes, the sheet was burnished to eliminate such downward protrusion of the underside of the membrane. FIG. 10 shows a cross section of a pore 56 through the sheet 58 after the undersurface of the sheet has been burnished. Each of the small openings was approximately 0.001 cm across, and the total area of the openings occupied only a very small percentage of the surface area of the membranes. Deflections of 0.25 to 0.35 cm were observed when membranes prepared as described above were tested in the apparatus illustrated in FIGS. 5 and 6

Figure 7:
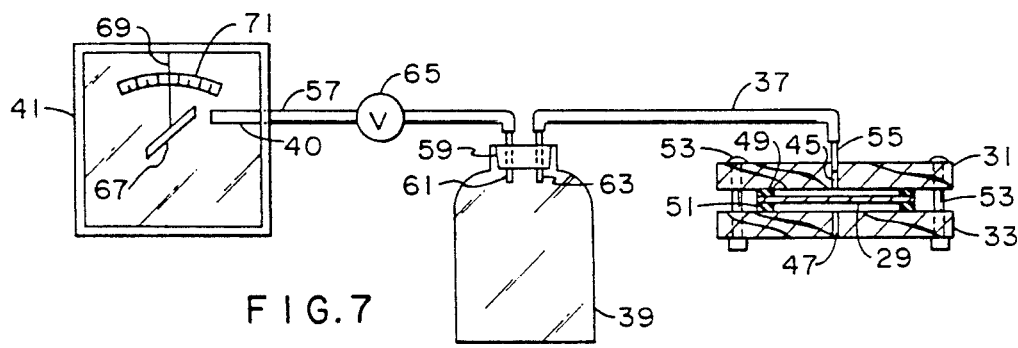
FIG. 7 is a side elevational view of another flow detector assembly for determining gas flow through a membrane of this invention.

FIG. 7 illustrates another experimental flow detector for measuring gas flow through a membrane of this invention. This detector includes two blocks 31, 33 of wood between which a membrane 29 is clamped so that the membrane has its bottom face exposed to the atmosphere and its top face exposed for air to flow into a tube 37 which feeds into a reservoir 39 and the flow detector box 41. Each block 31, 33 has a hole 45, 47 in its center for air flow to the membrane 29 which is spaced from the blocks by rubber gaskets 49, 51. The blocks 31, 33, membrane 29, and rubber gaskets 49, 51 are held together by bolts 53 through the blocks. The membrane 29 is approximately 10 cm in diameter and has pores therethrough formed in accordance with this invention.

A metal tube 55 is disposed in the hole 45 in the top block, and the rubber tube 37 connects the metal tube 55 to another metal tube 63 in the reservoir 39. Metal 61, rubber tube 57, and metal tube 40 connect the reservoir 39 to the flow detector box 41. All the metal tubes 40, 55, 61, 63 and the rubber tubes 37, 57 have inside diameters of 0.25 cm. The reservoir 39 is a 1.5 liter bottle, the purpose of which is to allow pressure to accumulate with time. The reservoir 39 has a rubber plug 59 in its top through which the plug has metal tubes 61, 63 which project for connection to the rubber tubes 37 and 57. A spring clip 65 of the type used for clipping sheets of paper together is used as a valve means in the rubber tube 57.

The flow detector includes a paper target 67 approximately 1 cm by 5 cm suspended in the box by means of a thread 69. One wall of the box has a scale 71 on it to facilitate taking visual readings of the amount of deflection of the target by air flow into or out of the end of the metal tube 40.

In operation of the flow detector of FIG. 7, the clip valve 65 was clamped and released in the rubber tube 57 in varying lengths of time to stop and start the flow of air through the tube. Air flow through the tube impinges on the target 67 and causes the indicator to move either away from or toward the end of the tube 40 depending on the direction of air flow.

The following Table I shows the results of testing membranes formed by puncturing treated xerox paper and polyethylene sheet as described above and the amount of deflection produced by such membranes using the apparatus illustrated in FIG. 7. In this Table the plus sign (+) before the deflection means that the target moved away from the end of tube 63 when the line was open, and the minus sign (−) means that the target moved toward the end of the tube 63 when the line was open.

TABLE I

| Membrane Description | Interval between time line between membrane & reservoir was closed and opened (minutes) | Temp. °F. | Atmospheric Pressure in.-Hg absolute | Deflection cm Mult ratio approx 3 |
|---|---|---|---|---|
| Paper coated on both | 60 | 75.20 | 29.821 | +0.2 |
| sides with skim milk | 60 | 74.55 | 29.823 | +0.2 |
| dried - 200 small | 60 | 74.20 | 29.859 | +0.3 |
| punctures - side | 1 | — | — | +0.25 |
| with smallest openings | 1 | — | — | +0.3 |
| burnished - burnished | 0.5 | — | — | +0.1 |
| side away from reservoir | 0.5 | — | — | +0.1 |
| Same as above but no | 60 | 74.50 | 29.899 | 0 |
| punctures | 60 | 74.40 | 29.929 | 0 |
|  | 60 | 72.90 | 29.964 | 0 |
|  | 60 | 73.00 | 29.959 | 0 |
|  | 1 | — | — | 0 |
|  | 1 | — | — | 0 |
| Paper given 2 coats | 60 | 72.65 | 29.889 | +0.35 |
| of skim milk-dried | 60 | 71.90 | 29.896 | +0.3 |
| after each application | 60 | 70.90 | 29.891 | +0.25 |
| 100 small punctures | 60 | 73.20 | 29.988 | +0.35 |
| side with smallest | 1 | — | — | +0.3 |
| openings burnished | 1 | — | — | +0.3 |
| burnished side away | 0.5 | — | — | +0.2 |
| from reservoir | 0.5 | — | — | +0.15 |
|  | 0.25 | — | — | +0.1 |
|  | 0.25 | — | — | +0.1 |
| Same as above but no | 60 | 73.50 | 29.944 | 0 |
| punctures | 60 | 73.40 | 29.926 | 0 |
|  | 60 | 72.70 | 29.928 | 0 |
|  | 1 | — | — | 0 |
|  | 1 | — | — | 0 |
| Paper given 2 coats of | 60 | 74.10 | 29.813 | +0.25 |
| 2.5% soap-dried after | 60 | 74.50 | 29.829 | +0.25 |
| each application | 60 | 74.60 | 29.845 | +0.3 |
| small punctures | 60 | 74.40 | 29.848 | +0.25 |
| side with smallest | 1 | — | — | +0.2 |
| openings burnished | 1 | — | — | +0.15 |
| burnished side away | 0.5 | — | — | +0.1 |
| from reservoir | 0.5 | — | — | +0.1 |
| Same as above but no | 1 | — | — | 0 |
| punctures | 1 | — | — | 0 |
| Polyethylene sheet | 60 | 72.30 | 29.705 | +0.35 |
| (approx. 0.01 cm thick) | 60 | 72.70 | 29.699 | +0.3 |
| 200 punctures | 60 | 72.60 | 29.688 | +0.35 |
| side with smallest | 60 | 73.00 | 29.702 | +0.35 |
| openings burnished | 60 | 74.20 | 29.710 | +0.3 |
| burnished side away | 60 | 75.10 | 29.721 | +0.3 |
| from reservoir | 1 | — | — | +0.3 |
|  | 1 | — | — | +0.3 |
|  | 0.5 | — | — | +0.2 |
|  | 0.5 | — | — | +0.25 |
|  | 0.25 | — | — | +0.1 |
|  | 0.25 | — | — | +0.15 |
| Same membrane as | 60 | 74.30 | 29.790 | −0.3 |
| above except that | 60 | 74.55 | 29.749 | −0.3 |
| burnished side was | 60 | 73.40 | 29.730 | −0.3 |
| toward reservoir | 60 | 72.00 | 29.699 | −0.35 |
|  | 1 | — | — | −0.3 |
|  | 1 | — | — | −0.25 |
|  | 0.5 | — | — | −0.15 |
|  | 0.5 | — | — | −0.15 |
|  | 0.25 | — | — | −0.15 |
|  | 0.25 | — | — | −0.1 |

It is clear from the results of the testing recorded in the above table that air was moved continuously through the membranes with punctures therethrough and moved through the membrane from the small to the larger end of the pores through the membrane. The membranes without punctures produced no air flow.

FIG. 11 is a diagram of a set-up for an experiment conducted by Professor Dean L. Ulrichson, PhD, Department of Chemical Engineering at Iowa State University in Ames, Iowa to determine whether a membrane of this invention will push or pump gas to a mass spectrometer faster than the gas will naturally diffuse to the mass spectrometer. The apparatus for the experiment included a mass spectrometer 75, three 3-way stopcocks 77, 79, 81 lines CD, FG between the stopcocks, a membrane 83, a source of argon 85, a feed line E from the argon gas, a source of pressurized air 87, line H from the air source 87, line A to atmosphere, and a line B connecting stopcock 77 with the mass spectrometer 75. The lines CD and FG and the feed lines in the apparatus all had ¼ inch inside diameters. The membrane 83 was mounted on a rectangular cover as illustrated in FIG. 6 with the larger pore openings toward gas line and the mass spectrometer 75. The membranes were formed from polyethylene sheet approximately 0.008 cm thick. The punctured area of each membrane was approximately 25 cm² and had approximately 1000 pores therethrough in which each small opening was approximately 0.001 cm in diameter. The total area occupied by the small openings was therefore approximately 0.003% of the surface area of one face or side of the membrane. The membrane used in Run B was not burnished and the membrane used in Run D was burnished. The flow into the mass spectrometer was about 1 cc/min. Line B to the mass spectrometer was a ⅛ inch tube about 3 inches long. The distance CD was 2 ½ inches, and the length of FG was 5 inches.

The test procedure was to charge line FG with argon with exhaust through A. The ends of line FG were then closed and line CD was purged of argon by air from air source 87. Test Run A was conducted by opening ports A, B, C, D, F and keeping ports E, G, H, I closed. Test Runs B and D were each conducted by charging line FG with argon, purging line CD with air and then opening ports A, B, C, D, F, G, I while keeping ports E, H closed. The following Table II contains the data generated by such Test Runs A, B, and D.

the membranes pumped the gas to the spectrometer faster than when only diffusion occurred.

The peaking of curves B and D may have been delayed slightly by diffusion of argon in both directions from line FG since opening of port I permits the argon to diffuse, at least initially, toward the membrane 83 as well as toward the mass spectrometer 75. Thus, the curves B and D may have peaked even earlier if diffusion from FG toward the membrane 83 could be some how eliminated or minimized by eliminating or shortening the line between port I and the membrane 83.

Run D also produced higher concentrations of argon than did any of the other runs. This also indicates that the membrane in Run D pushed the argon to the mass spectrometer. Run B did not produce higher concentrations of argon. This probably resulted from use of an unburnished membrane which had an ineffective pore size and configuration.

FIG. 13 illustrates an alternative method of forming a Porous membrane having tapered pores therethrough in accordance with this invention. As shown in this figure a sheet 60 of soft metal is pierced using a tool 62 having tapered steel spikes 64 thereon which are pressed into the soft metal against a steel back up plate 66. This technique could be used to produce membranes for operation at low pressures of about 0.1mm Hg where the diameter of the openings or pores could be of the order of approximately 0.05 cm since the mean free path for gas molecules at low pressures is much longer than

TABLE II

| Relative Time, sec. | Test A (16997) One End Closed | | Test B (16998) Membrane Open | | Test D (17001) Membrane Open | |
|---|---|---|---|---|---|---|
| | Scan Time, sec. | Argon Conc. % Rel. to O2 | Scan Time, sec. | Argon Conc. % Rel. to O2 | Scan Time, sec. | Argon Conc. % Rel. to O2 |
| 0 | 185 | 6.42 | 1324 | 6.46 | 95 | 6.47 |
| 50 | 235 | 6.42 | 1374 | 6.43 | 145 | |
| 100 | 285 | 6.62 | 1424 | 6.63 | 195 | 7.73 |
| 150 | 335 | 9.09 | 1474 | 8.91 | 245 | |
| 200 | 385 | 13.58 | 1524 | 13.14 | 295 | 18.74 |
| 250 | 435 | 18.37 | 1574 | 17.47 | 345 | 24.8 |
| 300 | 485 | 22.5 | 1624 | 21.37 | 395 | 29.26 |
| 350 | 535 | 25.9 | 1674 | 24.18 | 445 | 32.42 |
| 400 | 585 | 28.52 | 1724 | 26.46 | 495 | 34.87 |
| 450 | 635 | 30.91 | 1774 | 28.2 | 545 | 36.7 |
| 500 | 685 | 32.52 | 1824 | 29.13 | 595 | 37.98 |
| 550 | 735 | 33.86 | 1874 | 29.99 | 645 | 38.36 |
| 600 | 785 | 34.69 | 1924 | 30.54 | 695 | 38.5 |
| 650 | 835 | 34.98 | 1974 | 30.63 | 745 | 38.5 |
| 700 | 885 | 35.3 | 2024 | 30.16 | 795 | 38.48 |
| 750 | 935 | 35.36 | 2074 | 29.84 | 845 | 37.84 |
| 800 | 985 | 35.14 | 2124 | 29.47 | 895 | 37.27 |
| 850 | 1035 | 34.73 | 2174 | 29.08 | 945 | 36.29 |
| 900 | 1085 | 34.39 | 2224 | 28.23 | 995 | 35.45 |
| 950 | 1135 | 33.98 | 2274 | 27.8 | 1045 | 34.39 |
| 1000 | 1185 | 33.24 | 2324 | 27.1 | 1095 | 33.35 |

FIG. 12 is a plot of the argon concentration measured by the mass spectrometer at intervals of 50 seconds following opening of the ports on the stopcocks in each of the runs. A comparison of Run A, which measured normal diffusion, against Runs B and D which measured gas flow through reveals two important differences. First, the curve for Runs B and D peak earlier (600-650 seconds) than does the curve for Run A (750 seconds). This means that the flow of argon to the mass spectrometer must have been pushed or pumped by the membranes. The concentration detected by the mass spectrometer increased more rapidly after the start of the experiment for membrane D and tailed off more quickly for both membranes when port I was open, so at atmospheric or higher pressures.

Another way for producing a membrane of this invention is by anodizing high purity aluminum sheet 68 (FIG. 14) and then treating the anodized sheet with dilute nitric acid to produce tapered holes 70 in the sheet and dissolve the aluminum at the base of the holes 70 to produce pores through the sheet (FIG. 15). Supporting ribs 72 can be provided either integrally of the sheet 68, as illustrated, or as separate pieces. This method of producing a porous membrane will produce very small pores in a membrane that could be used at or near atmospheric pressure.

FIG. 16 illustrates still another way of producing a membrane of this invention by passing a sheet or strip 89 of treated paper, plastic or soft metal, and a backup strip 91 of paper or plastic, between a pair of rotating rolls 93, 95. The roll 93 has spikes or needles 97 on it which pierce the strip 89 to produce many small pores 99 through the strip.

FIG. 17 illustrates a fractionating column 74 for separating light and heavy molecules of gas using membranes of this invention. The column includes an inlet feed 76 for introducing a mixture of light and heavy molecules into the column, an outlet 78 for gas enriched with light molecules and an outlet 80 for gas enriched with heavy molecules. In the column 74 selected for illustration, five separate membranes 82 are employed with the membranes all oriented so that the surface thereof with the small openings are all facing the same direction toward the outlet 80 for heavy molecules. The column 74 may also have one or more reflux channels 84 for recycling the gases upstream toward the outlet 80 of the column through which the gas enriched with heavy molecules will exit.

In accordance with this invention, the lighter molecules of a gas are more active, or move faster, and will move through a partition at a faster rate than will the slow moving, heavy molecules. This means that the membranes of this invention, which are all oriented in like direction, will produce increased concentration of the light molecules in on the down stream side of each of the membranes and an increased concentration of heavy molecules on the upstream side of the membranes. As used herein upstream side means the side of the membranes having the smaller size openings therein, and the downstream side means the side of the membrane having the larger openings therein. As explained above such orientation of the pores in the membrane causes a fluid flow through the membrane from the side with small openings in it to the side thereof with the large openings in it. Since the lighter molecules move faster they will be concentrated toward the downstream side of each membrane, with each membrane further enriching the gas.

The reflux tubes 84 may require pumps not shown to move the gas toward the upstream side of each membrane to produce increased efficiency in the column. However, the reflux tubes and pumps are not required for the operation of the fractionating column.

FIG. 18 illustrates a proposed power generating system 90 using membranes of this invention. In this system, one or more membranes 92 of this invention are positioned to feed gas through a flume 94 into a turbine 96 for generating power. A possible problem with this system is to generate sufficient fluid flow through the membrane to produce adequate power output by the turbine. However, high power outputs are theoretically possible, especially when the pore sizes in the membrane are close to the mean free path for the feed gas.

FIG. 19 illustrates an alternative form of a power generating system 98 using membranes of this invention. This system operates from the pores in the membrane 100 acting as small jets or rockets for moving the rotating assembly by the reaction force of gas moving through the membrane. The membranes on the mill 98 are all oriented so that their surfaces with the small openings therein are on the same face of the membranes, either on the counterclockwise face or the clockwise face. In the embodiments selected for illustration, which is shown rotating in a counterclockwise direction, the small openings in the membranes are in the faces thereof which are directed clockwise. Fluid flow is in the clockwise direction causing the wind mill to rotate in the opposite direction.

FIG. 20 is a schematic drawing of power generating system 102 for operating at low pressure. In this system the gas, which is used to operate the power generator 104, could be heated by a heat exchanger 106 to increase the activity of the molecules in the gas. The gas can be maintained at a low pressure in order to maximize the mean free path of the molecules and permit the use of membranes with larger pore diameters. The power output could be increased by the application of heat which increases the activity of the molecules and increases the work output. The heat for the system can be provided by a variety of sources such as solar heat, hydrocarbon fuels or warm water.

The power system 102 of FIG. 20 may operate with the turbine system of FIG. 18 or the windmill type system of FIG. 19. The gas from the heat exchanger is fed to the power system to drive the power generator. It is recognized that heat exchange to a low pressure gas would be relatively poor. One way to minimize such poor heat transfer may be to operate with a medium having a boiling point below the inlet temperature to the power unit 102 but above the outlet temperature of the power unit. The mist formed at the outlet temperature could be passed through a demister and heat transferred to the liquid to generate vapor. This would take advantage of the higher heat transfer to a liquid form than to a gas form at low pressure.

FIG. 21 is a schematic diagram of a proposed vacuum pump using membranes of this invention to produce pressures from a thin atmosphere. The system could be used to produce pressure for a space colony or space station. The system includes a conventional vacuum pump 110 and one or more membranes 112 which combine to pump from a vacuum or very low pressure as at 114 to an intermediate vacuum 116 to pressures of atmospheric or higher. The membranes 112 produce fluid flow of molecules of gas from the very low pressure (high vacuum) 114 into the intermediate vacuum 116, and the conventional vacuum pump 110 raises the pressure to atmospheric at outlet 118.

Whereas particular embodiments of this invention have been described above, for purposes of illustration, it will be evident to those skilled in the art that numerous variations in the details may be made without departing from the invention as defined in the appended claims.

I claim:

1. A method suitable for generating power comprising:
   (a) providing at least one porous membrane with small pores therethrough of a size and shape to utilize random motion of molecules in a gas to flow gas through the wall predominantly in one direction; and
   (b) producing power by means responsive to the flow of gas through said wall.

2. A method as set forth in claim 1 in which the minimum cross-sectional extent of said pores is of the same order of magnitude as the mean free path of the gas to be moved.

3. The method as set forth in claim 1 in which the gas is below atmospheric pressure.

4. A method as set forth in claim 1 in which the gas is maintained at a temperature above ambient temperature.

5. A method as set forth in claim 1 in which the gas is maintained at a pressure below atmospheric pressure and at a temperature above ambient.

6. Apparatus for generating power comprising at least one porous membrane with small pores therethrough of a size and shape to utilize random motion of molecules in a gas to move gas through the wall predominantly in one direction and means responsive to said gas flow to produce mechanical power therefrom.

7. Apparatus as set forth in claim 6 in which said responsive means is a turbine.

8. Apparatus as set forth in claim 6 in which said responsive means is a rotatable drive shaft.

9. Apparatus as set forth in claim 6 in which said membrane is enclosed in a sealed system and includes means for reducing the atmospheric pressure therein.

10. Apparatus as set forth in claim 9 which includes means for raising the temperature of gas in the system.

11. Apparatus as set forth in claim 6 in which the surfaces in the pores have properties which enhance utilization of the random motion of molecules in a gas to move the fluid through the wall predominantly in one direction.

12. Apparatus as set forth in claim 11 in which the surface properties vary along the axial extent of the pores.

13. Apparatus as set forth in claim 6 in which the gas is a compressible gas and in which a majority of the pore openings are smaller toward one side of said wall than toward the other side of the wall.

14. Apparatus as set forth in claim 6 in which the cross section of most of the pores is concave with respect to the center line of the pore.

15. Apparatus as set forth in claim 6 in which the cross section of most of the pores is convex with respect to the center line of the pore.

16. Apparatus as set forth in claim 6 in which the minimum cross sectional extent of most of said pores is less than fifty times the mean free path of the molecules in the gas to be moved through the wall.

17. Apparatus as set forth in claim 6 in which the minimum cross sectional extent of most of said pores is less than three hundred times the mean free path of the molecules in the gas to be moved through the wall.

18. Apparatus as set forth in claim 6 in which the ratio of the size of the large openings divided by the size of the small openings is greater than 1.25 and the ratio of the membrane thickness divided by the size of the large openings is greater than 1.0.

19. Apparatus as set forth in claim 6 in which the minimum cross sectional extent of most of said pores is less than five times the mean free path of the molecules in the gas to be moved through the wall.

20. Apparatus as set forth in claim 6 in which the cross sectional extent of most of said pores gradually increases from one side of said wall to the other.

21. Apparatus as set forth in claim 6 in which the walls of most of said pores are generally reflective to gas molecules.

22. Apparatus as set forth in claim 6 in which said pores are closely spaced.

23. Apparatus as set forth in claim 6 in which said pores are frustoconical.

* * * * *